US007296018B2

(12) United States Patent
Abe et al.

(10) Patent No.: US 7,296,018 B2
(45) Date of Patent: Nov. 13, 2007

(54) RESOURCE-LIGHT METHOD AND APPARATUS FOR OUTLIER DETECTION

(75) Inventors: Naoki Abe, Rye, NY (US); John Langford, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 10/749,518

(22) Filed: Jan. 2, 2004

(65) Prior Publication Data

US 2005/0160340 A1 Jul. 21, 2005

(51) Int. Cl.
*G06F 17/00* (2006.01)

(52) U.S. Cl. ............................ 707/6; 707/102; 706/16; 706/20; 706/25

(58) Field of Classification Search .................... 707/6, 707/102; 706/1, 16, 20, 25
See application file for complete search history.

(56) References Cited

U.S. PATENT DOCUMENTS 6,405,318 B1 * 6/2002 Rowland ..................... 726/22
6,424,929 B1 * 7/2002 Dawes ....................... 702/179
6,519,604 B1 * 2/2003 Acharya et al. ............ 707/102
6,643,629 B2 * 11/2003 Ramaswamy et al. ........ 706/45
6,728,690 B1 * 4/2004 Meek et al. .................. 706/25
2003/0004902 A1 * 1/2003 Yamanishi et al. ............ 706/1
2003/0204320 A1 * 10/2003 Arouh et al. ................. 702/20
2003/0236652 A1 * 12/2003 Scherrer et al. ............... 703/2
2004/0230586 A1 * 11/2004 Wolman ..................... 707/100

* cited by examiner

*Primary Examiner*—John Cottingham
*Assistant Examiner*—Robert M Timblin
(74) *Attorney, Agent, or Firm*—Whitham, Curtis, Christofferson & Cook, PC; Stephen C. Kaufman

(57) ABSTRACT

Outlier detection methods and apparatus have light computational resources requirement, especially on the storage requirement, and yet achieve a state-of-the-art predictive performance. The outlier detection problem is first reduced to that of a classification learning problem, and then selective sampling based on uncertainty of prediction is applied to further reduce the amount of data required for data analysis, resulting in enhanced predictive performance. The reduction to classification essentially consists in using the unlabeled normal data as positive examples, and randomly generated synthesized examples as negative examples. Application of selective sampling makes use of an underlying, arbitrary classification learning algorithm, the data labeled by the above procedure, and proceeds iteratively. Each iteration consisting of selection of a smaller sub-sample from the input data, training of the underlying classification algorithm with the selected data, and storing the classifier output by the classification algorithm. The selection is done by essentially choosing examples that are harder to classify with the classifiers obtained in the preceding iterations. The final output hypothesis is a voting function of the classifiers obtained in the iterations of the above procedure.

26 Claims, 3 Drawing Sheets

```
count > 40 : 0 (2284.0/13.0)
count <= 40 :
|   count <= 0 : 0 (1375.0/1.4)
|   count > 0 :
|   |   srv_count > 53 : 0 (207.0/7.3)
|   |   srv_count <= 53 :
|   |   |   srv_count <= 0 : 0 (123.0/1.4)
|   |   |   srv_count > 0 :
|   |   |   |   serror_rate <= 0.000502569 :
|   |   |   |   |   dst_host_serror_rate <= 0.0101501 :
|   |   |   |   |   |   etc.
|   |   |   |   |   dst_host_serror_rate > 0.0101501 :
|   |   |   |   |   |   etc.
|   |   |   |   serror_rate > 0.000502569 : etc.
```

*FIGURE 3*

RESOURCE-LIGHT METHOD AND APPARATUS FOR OUTLIER DETECTION

BACKGROUND OF THE INVENTION

1. Field of the Invention

The present invention generally relates to the art and technology of machine learning and data mining and, more particularly, to outlier detection methods and apparatus which are light on computational resources without sacrificing predictive performance.

2. Background Description

There are certain applications of data mining, for example, in which it is required to classify future examples into normal and abnormal classes based on past data that consist only of normal data. This type of problem is called "outlier detection" or "anomaly detection" and is a form of the so-called unsupervised learning in which no labeled data are available at the training time. Real world problems for which outlier detection is desired include intrusion detection in network data and fraud detection in telecom and financial data.

To date, most existing methods of outlier detection are based on density estimation methods, that is, methods that attempt to estimate the distribution of the normal data, and then use the estimated density model to calculate the probability of each test data, and classify those that receive unusually small probabilities as outliers, and thus as candidates of the class of interest, such as intrusions or frauds.

With this type of method based on density estimation, there has been a problem that the required computational resources are heavy, both in terms of computation time and storage. For example, a representative density estimation method, known as the Parzen window method, estimates the density as the mixture of Gaussians placed around all training data. See, Yueng and Chow, "Parzen-Window Network Intrusion Detectors", *Proc. of the 16th International Conference on Pattern Recognition*, 2002. As such, it requires the storage of all input data points, thus necessitating an amount of storage that grows linearly in the number of data.

In many applications of outlier detection, such as intrusion and fraud detection, the number of data tends to be extremely large, say in tens of millions, and computationally demanding methods are not well-suited, especially those based on storing all past data.

SUMMARY OF THE INVENTION

It is therefore an object of the present invention to provide outlier detection methods and apparatus, whose requirement are light on computational resources, especially on the storage requirement, and yet achieve a state-of-the-art predictive performance.

According to the invention, the outlier detection problem is first reduced to that of a classification learning problem, and then selective sampling based on uncertainty of prediction is applied to enhance predictive performance. The main advantage of the invention is enhanced predictive accuracy, but a significant added advantage is the reduction in sample size. The reduction to classification essentially consists in using the unlabeled normal data as positive examples, and randomly generated synthesized examples as negative examples, the proportion of which can be controlled depending on the relative importance of false negative and false positive prediction errors. The randomly generated synthesized data could be generated in a number of ways, but a simple way is to generate each feature value independently according to the marginal distribution for the feature in question, which can easily be pre-estimated using the real normal data assuming it can be approximated as a normal distribution or some other simple form of probability distribution (e.g., simply by estimating its mean and variance from the data).

Application of selective sampling makes use of an underlying, arbitrary classification learning algorithm, the data labeled by the above procedure, and proceeds iteratively. Each iteration consisting of selection of a smaller subsample from the input data, training of the underlying classification algorithm with the selected data, and storing the classifier output by the classification algorithm. The selection is done by essentially choosing examples that are harder to classify with the classifiers obtained in the preceding iterations. The final output hypothesis is a voting function of the classifiers obtained in the iterations of the above procedure.

The above reduction, if applied without selective sampling, suffers from the potential problem that the synthesized generated negative examples may violate some implicit constraints that are satisfied by all realistic data in the domain, and give away their label too easily (namely, that they are negative, abnormal examples), merely by the fact that they are unrealistic. When this happens, the obtained classifier is likely to be useless, since it can classify the training data perfectly but will not be able to predict the labels of the unseen, future data, which consist only of realistic data. The application of selective sampling based on uncertainty of prediction to the present context has the effect of weeding out such "easy" synthesized examples from the training set, thereby forcing the classification algorithm to learn to separate the normal and abnormal data, not to separate the realistic and unrealistic data. Thus, in addition to the effect of reducing data size generally achieved by the selective sampling methods of the invention, selective sampling applied to the present context of a classification problem transformed from an outlier detection via the proposed reduction serves a crucial role.

As compared to traditional methods of outlier detection, the present invention realizes a high accuracy prediction of outliers in future data, with much smaller computational requirement. In particular, the storage requirement is drastically cut down, since in each iteration only a small fraction of the input data need be stored for the purpose of training the classification algorithm. In addition, it can achieve state-of-the-art prediction performance.

BRIEF DESCRIPTION OF THE DRAWINGS

The foregoing and other objects, aspects and advantages will be better understood from the following detailed description of a preferred embodiment of the invention with reference to the drawings, in which:

FIG. 3 illustrates an example of a decision tree, which could be the output of the classification algorithm in one iteration.

DETAILED DESCRIPTION OF A PREFERRED EMBODIMENT OF THE INVENTION

Figure 1:
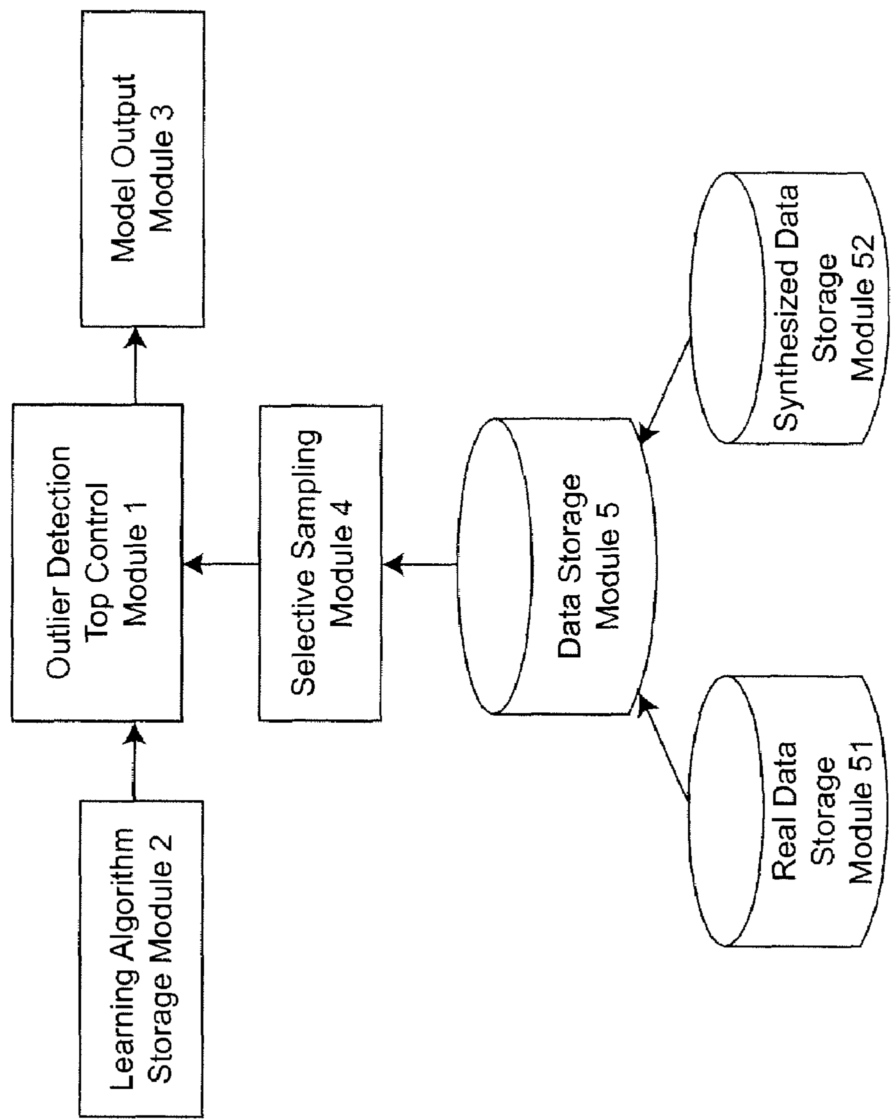
FIG. 1 is a block diagram of a data processing system showing the data flow of the implemented method according to the invention.

Referring now to the drawings, and more particularly to FIG. 1, there is shown a data processing system illustrating the data flow of the implemented method according to the invention. The data processing system comprises a top control module 1, a learning algorithm storage module 2, a model output 3, a selective sampling module 4, and a data storage module 5. The data storage module 5 comprises a real data storage module 51 and a synthesized data storage module 52.

The top control module 1 controls the overall control flow, making use of various sub-components of the system. The learning algorithm storage module 2 stores a representation of an algorithm for classification learning. An arbitrary algorithm for classification can be used here, such as decision tree learning algorithms, naïve Bayes method, logistic regression method and neural network training algorithms. The model output module 3 stores the models obtained as a result of applying the learning algorithm stored in module 2 to training data given by module 4 and outputs a final model by aggregating these models. The selective sampling module 4 accesses the data stored in the data storage module 5, selectively samples a relatively small subset of the data, and passes the obtained sub-sample to module 1. The data storage module 5 may comprise two separate modules, as shown, one for storing real data corresponding to "normal" data, and the other for storing synthesized data corresponding to "abnormal" data. Those skilled in the art will understand that a single, physical data storage module may be used instead of two by means of partitioning, providing two logical data storage modules in a single physical data storage module.

The first aspect in the process implemented on the data processing system of FIG. 1 is that of reducing the outlier detection problem to that of a classification learning problem. This is done by using input data (normal examples) as "positive" examples and randomly generated synthesized examples as "negative" examples. Then a classification rule is learned from the obtained data.

Classification learning is one of the most well studied problems in learning, as found in many references in the literature. See, for example, Chapters 2 and 4 of *The Elements of Statistical Learning* by T. Hastie, R. Tibshirani and J. Friedman, published by Springer 2001. As described in this reference, classification and regression are two forms of"supervised learning", in which the learner's goal is to estimate a function given finite training data, that is, pairs representing members of some domain and their (possibly noisy) function values. Classification refers to the case in which the function to be learned is a binary function, namely one that maps the domain into a set of two labels, such as "normal" and "abnormal".

The second aspect in the process implemented on the data processing system of FIG. 1 is that of applying selective sampling based on uncertainty of prediction to enhance the predictive accuracy and to reduce the amount of data required for data analysis. This is done by iteratively selecting data that are "hard to classify" to train the classifier. Then, all classifiers are aggregated to make a final prediction. This process has the effect of weeding out synthesized negative examples that are "unrealistic" and too easy to classify (and which do not help in identification of outliers in future test data).

The method implemented on the data processing system shown in FIG. 1 has the advantage of computational efficiency, since in general, classification is easier than density estimation. Classification with selective sampling requires few data and is extremely memory-light.

Figure 2:
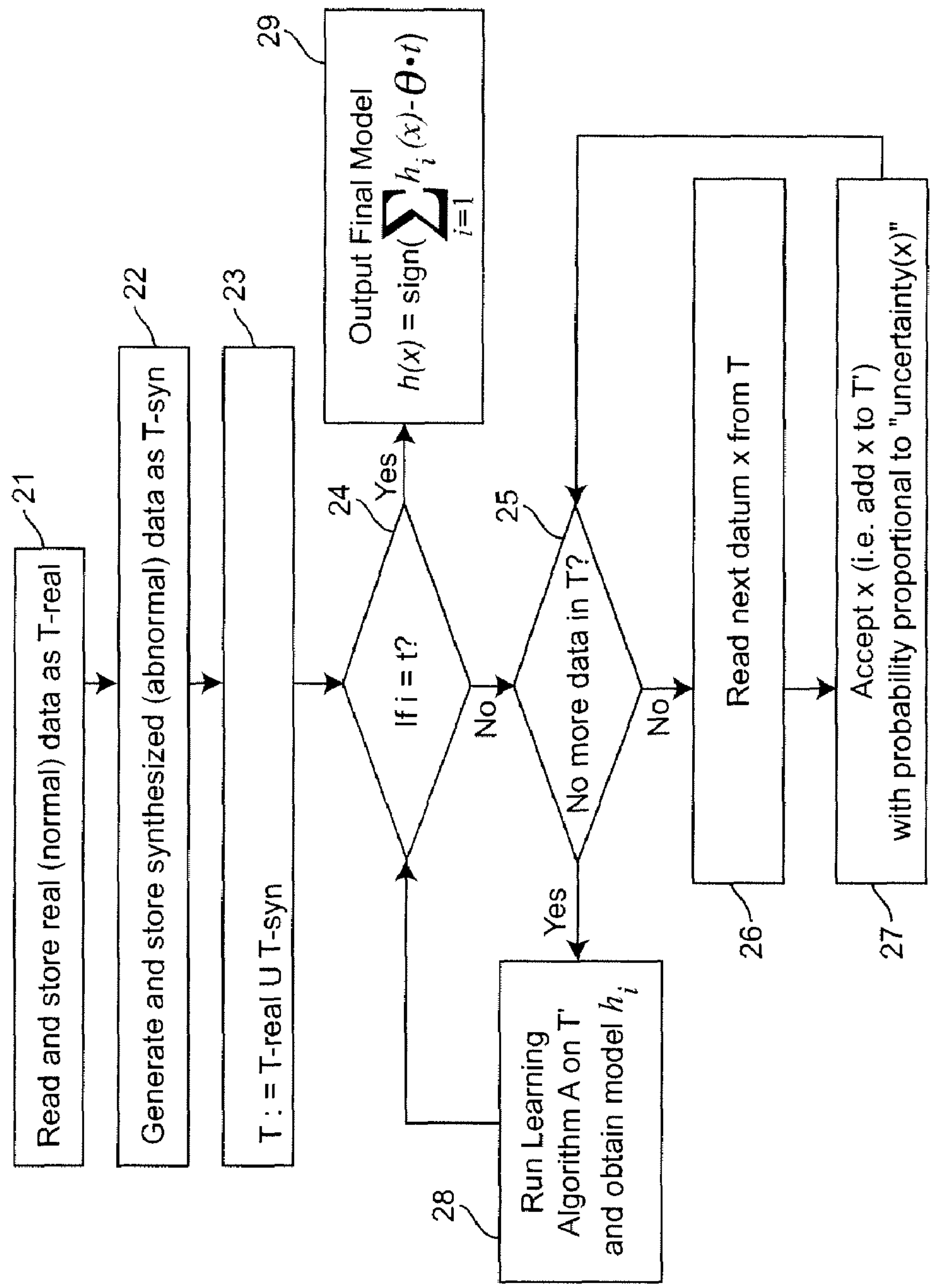
FIG. 2 is a flow chart showing the process implemented by the invention.

The process implemented by the data processing system shown in FIG. 1 is shown in the flow chart of FIG. 2. The process begins in step 21 where real ("normal") data is read and stored as T-real. In step 22, synthesized ("abnormal") data is generated and stored as T-syn. The outlier detection begins at step 23 for Learner A, Data T-real, and count t, where Data T=T-real C T-syn. Step 24 is a decision block which controls the iteration from i=1 to t. If i is not equal to t, then a determination is made in a second decision block at step 25 to determine if there is more data in T'. If not, selective sampling of data in data storage modules 51 and 52 is done In steps 26 and 27, respectively, to generate selectively sampled data T', where T' is selectively sampled from data T with sampling probability equaling a measure of uncertainty of prediction for the example or, alternaively, sampling probability proportional to the product of a measure of uncertainty and a measure of cost of mis-classifying the same example. In this process of selective sampling, the given data is scanned and, as the data is scanned, the decision of whether to accept each datum is made independently and with acceptance probability proportional to a measure of uncertainty associated with that example. Only those data that are accepted are stored. The selectively sampled and stored data is returned to step 25, after which, in step 28, the learning algorithm A is run on data T'. to obtain model $h_i$ (i.e., $h_i$=A(T'.)). The index i of the iteration is incremented by one, i.e., i=i+1, and a return is made to decision block 24. When the iteration is complete, the final model is output at step 27 as $$h(x) = \mathrm{sign}\left(\sum_{i=1}^{t} h_i(x) - \theta \cdot t\right).$$

A number of variations are possible in the exact specification of the selective sampling procedure; including one which is described below. The uncertainty of a given element of the domain, x, is defined using what is known as the "margin" for that example x, given by all the models obtained in the iterations so far. Letting $h_i$, i=1, . . . , s denote the models obtained so far. Here each model is a "classifier", that is, a representation of a function that maps elements of the domain to a set of two labels. Without loss of generality, here it is assumed that the two labels are −1 and +1. Then, the margin for a domain element, x, given a set of models, $h_i$, i=1, . . . , s, is defined as the absolute value of the sum of $h_i(x)$, i=1, . . . , s. Note that the high margin indicates higher confidence of prediction by the models. Given the margin for x, written m(x), a good measure of uncertainty of prediction for x can be obtained in at least two ways. One is to define the uncertainty for x, u(x), as the binomial probability for obtaining (s+m(x))/2 successes in s Bernoulli trials, each with success probability of a half. More specifically, $$\mathrm{Binomial}\left(s, \frac{s+m(x)}{2}\right) = \frac{s!}{((s+m(x))/2)!(s-m(x)/2)!}\left(\frac{1}{2}\right)^s$$

A second method, which is an approximation of the first method, is to define u(x) as the probability of obtaining (s+m(x))/2 or greater, with respect to the Gaussian distribution with mean s/2 and standard deviation ($\sqrt{s}$)/2. More specifically, $$\mathrm{gauss}\left(\frac{s}{2}, \frac{\sqrt{s}}{2}, \frac{s+m(x)}{2}\right) =$$

-continued $$1-\int_{-\infty}^{s+m(x))/2}\frac{1}{\sqrt{s\pi/2}}\exp\left\{-\left(y-\frac{s}{2}\right)^2/s\right\}dy$$

It is also possible to use a sampling probability which is proportional to the product of a measure of uncertainty and a measure of cost. That is, the sampling probability for an example x may be set proportional to u(x) times c(x), where u(x) is the same as defined above and c(x) is the cost of mis-classifying the example x. For example, in the example of network intrusion detection, the cost of mis-classifying an intrusion as a normal connection may be one hundred times more costly (in terms of economical loss to the party interested in intrusion detection) than that of mis-classifying a normal connection as an intrusion. If that is the case, for an example x, which is labeled as "abnormal" in the training data, the value of the cost would be c(x)=100, whereas for the same example x, which is labeled as "normal" in the training data, the value of the cost would be c(x)=1. It is possible to set the sampling probability proportional to u(x) times c(x), for example, by inspecting the maximum possible value, M, of u(x) times c(x) is in a moderately sized sample, and then dividing the product u(x)×c(x) for each x by M.

As a concrete example of applying the proposed method to a real world problem, we describe an application to network intrusion detection. Network intrusion detection has recently become a prototypical application problem for outlier detection. This is because in this application it is difficult to collect a large set of examples of intrusions, and furthermore the nature of intrusions keep changing and thus it is not always possible to detect new intrusions based on past patterns of intrusions.

A network intrusion detection system based on the proposed method/system for outlier detection consists of the following steps:

1) Convert past network connection data to a set of feature vectors, by mapping information on a network connection to a feature vector.

2) Apply the method according to the invention to the above data set, and obtain an outlier detection rule. p1 3) Convert new network connection data to feature vectors, apply the above outlier detection rule to them, and flag as "suspicious" those connections corresponding to feature vectors that are classified as "outliers".

A typical set of features used to transform connection data into a well-defined feature vector is those used in the network intrusion data set known as the "KDD CUP 99" data, which is public ally available at http://kdd.ics.uci.edu/databases/kddcup99/kddcup99.html. Here is the list of features in this data set (given in three separate tables.)

TABLE 1

BASIC FEATURES OF INDIVIDUAL TCP CONNECTIONS

| feature name | description | type |
|---|---|---|
| duration | length (number of seconds) of the connection | continuous |
| protocol_type | type of the protocol, e.g. tcp, udp, etc. | discrete |
| service | network service on the destination, e.g., http, telnet, etc. | discrete |
| src_bytes | number of data bytes from source to destination | continuous |
| dst_bytes | number of data bytes from destination to source | continuous |
| flag | normal or error status of the connection | discrete |
| land | 1 if connection is from/to the same host/port; 0 otherwise | discrete |
| wrong_fragment | number of "wrong" fragments | continuous |
| urgent | number of urgent packets | continuous |

TABLE 2

CONTENT FEATURES WITHIN A CONNECTION SUGGESTED BY DOMAIN KNOWLEDGE

| feature name | description | type |
|---|---|---|
| hot | number of "hot" indicators | continuous |
| num_failed_logins | number of failed login attempts | continuous |
| logged_in | 1 if successfully logged in; 0 otherwise | discrete |
| num_compromised | number of "compromised" conditions | continuous |
| root_shell | 1 if root shell is obtained; 0 otherwise | discrete |
| su_attempted | 1 if "su root" command attempted; 0 otherwise | discrete |
| num_root | number of "root" accesses | continuous |
| num_file_creations | number of file creation operations | continuous |
| num_shells | number of shell prompts | continuous |
| num_access_files | number of operations on access control files | continuous |
| num_outbound_cmds | number of outbound commands in an ftp session | continuous |
| is_hot_login | 1 if the login belongs to the "hot" list; 0 otherwise | discrete |
| is_guest_login | 1 if the login is a "guest"login; 0 otherwise | discrete |

TABLE 3

TRAFFIC FEATURES COMPUTED USING A TWO-SECOND TIME WINDOW

| feature name | description | type |
|---|---|---|
| count | number of connections to the same host as the current connection in the past two seconds<br>Note: The following features refer to these same-host connections. | continuous |
| serror_rate | % of connections that have "SYN" errors | continuous |
| rerror_rate | % of connections that have "REJ" errors | continuous |
| same_srv_rate | % of connections to the same service | continuous |
| diff_srv_rate | % of connections to different services | continuous |
| srv_count | number of connections to the same service as the current connection in the past two seconds<br>Note: The following features refer to these same-service connections. | continuous |
| srv_serror_rate | % of connections that have "SYN" errors | continuous |
| srv_rerror_rate | % of connections that have "REJ" errors | continuous |
| srv_diff_host_rate | % of connections to different hosts | continuous |

As a result of applying the outlier detection method to a data set consisting of these features, using a decision tree algorithm as the "classification learning algorithm" stored in module 2, one obtains as the outlier detection rule, a voting function over a number of decision trees, such as the tree shown in FIG. 3.

While the invention has been described in terms of a single preferred embodiment, those skilled in the art will recognize that the invention can be practiced with modification within the spirit and scope of the appended claims.

The invention claimed is:

1. A method of outlier detection comprising:

generating a plurality of synthesized data, each representing a randomly generated state within a given vector space, said generating including a random number generation;

receiving a plurality of real sample data, each representing a detected real event as represented in said given vector space;

forming a candidate sample set comprising a union of at least a part of said plurality of synthesized data and said plurality of real sample data, said candidate sample set having a starting population, said candidate sample set being unsupervised as to which members will be classified by said method as being outliers;

generating a set of classifiers, each member of said set being a procedure or a representation for a function classifying an operand data as an outlier or a non-outlier, said generating a set of classifiers including;

initializing said set of classifiers to be an empty set, selectively sampling said candidate sample data to form a learning data set, said selectively sampling including:

i) applying said set of classifiers to each of said candidate sample data and, if any classifiers are extant in said set, generating a corresponding set of classification results, ii) identifying a consistency, for each of said candidate sample data, among said data's corresponding set of classification results, iii) calculating an uncertainty value for each of said candidate sample data based on said identified consistency of said data's corresponding set of classification results, iv) calculating a sampling probability value for each of said candidate sample data based, at least in part, on the corresponding uncertainty value based on said set of classification results, and v) sampling from said candidate data to form said learning data set based, at least in part, on said sampling probability values, such that said learning data set has a population substantially lower than the starting population, generating another classifier based on said learning data set, updating said set of classifiers to include said another classifier, and repeating said selectively sampling, said generating another classifier, and said updating until said set of classifiers includes at least a given minimum t members; and generating an outlier detection algorithm based, at least in part, on at least one of said another classifiers, for classifying a datum as being an outlier or a non-outlier.

2. The method of claim 1, further comprising:

receiving a given mis-classifying cost data associated with at least one of said synthesized samples, representing a cost of said outlier detection algorithm mis-classifying said at least one synthesized sample as a non-outlier.

3. The method of claim 2, wherein said constructing said learning data set form said candidate sample data is further based on said mis-classifying cost.

4. The method of claim 1, wherein said calculating a probability of said identified consistency uses a Binomial probability function.

5. The method of claim 1, wherein said calculating a probability of said identified consistency uses a Gaussian probability function.

6. The method of claim 1, said generating synthesized data generates said synthesized data in accordance with a given statistical likelihood of said generated data meeting an outlier criterion.

7. The method of claim 1, wherein said generating an outlier detection algorithm generates the outlier detection algorithm such that said algorithm applies an aggregate of members of said set of classification algorithms, calculates a corresponding set of detection result data representing each of said aggregate's member's classification, and applies a voting scheme to said corresponding set of detection result data.

8. The method of claim 1, wherein said calculating a probability of said consistency assumes each classification result within said set has a 50-50 probability of representing an operand as meeting an outlier criterion, statistically independent of said operand and of all other classification results within said set.

9. The method of claim 8, wherein said calculating a probability of said identified consistency a Binomial probability function.

10. The method of claim 8, wherein said calculating a probability of said identified consistency uses a Gaussian probability function.

11. The method of claim 6, wherein said calculating a probability of said consistency assumes each classification result within said set has a 50-50 probability of representing an operand as meeting said outlier criteria, statistically independent of said operand and of all other classification results within said set.

12. The method of claim 11, wherein said calculating a probability of said identified consistency uses a Binomial probability function.

13. The method of claim 11, wherein said calculating a probability of said identified consistency uses a Gaussian function.

14. A system for classifying externally detected samples as one of at least normal and an outlier, comprising:

a machine controller having a readable storage medium;

a machine-readable program code, stored on the machine-readable storage medium, having instructions to:

generate a plurality of synthesized data, each representing a randomly generated state within a given vector space, said generating including generating a random number;

receive a plurality of real sample data, each representing an observed event as represented in said given vector space;

form a candidate sample set comprising a union of at least a part of said plurality of synthesized data and said plurality of real sample data, said candidate sample set having a starting population;

generate a set of classifiers, each member of said set being a procedure or a representation for a function classifying an operand data as an outlier or a non-outlier, said generating a set of classifiers including:

initializing said set of classifiers to be an empty set, selectively sampling said candidate sample data to form a learning data set, said selectively sampling including:

i) applying said set of classifiers to each of said candidate sample data and, if any classifiers are extant in said set, generating a corresponding set of classification results, ii) identifying a consistency, for each of said candidate sample data, among s aid data's corresponding set of classification results, iii) calculating an uncertainty value for each of said candidate sample data based on said identified consistency of said data's corresponding set of classification results, iv) calculating a sampling probability value for each of said candidate sample data based, at least in part, on the corresponding uncertainty value based on said set of classification results, and v) sampling from said candidate data to form said learning data set based, at least in part, on said sampling probability values, such that said learning data set has a population lower than the combined first and second population, generating another classifier based on said learning data set, updating said set of classifiers to include said another classifier, and repeating said selectively sampling, said generating another classifier, and said updating until said set of classifiers includes at least a given minimum t members; and to generate an outlier detection algorithm based, at least in part, on at least one of said another classifiers, for classifying a datum as being an outlier or a non-outlier as rules for determining outliers.

15. The method of claim 14, wherein said machine readable program code further comprises instructions for:

receiving a given mis-classifying cost data associated with at least one of said example abnormal state data, said cost data representing a cost of said outlier detection algorithm mis-classifying a data equal to said abnormal state data as not meeting an outlier criterion.

16. The system of claim 14, wherein said machine-readable code instructions constructing said learning data set from said candidate sample data include instructions for constructing said learning data based, at least in part, on said mis-classifying cost.

17. The system of claim 14, wherein said machine-readable code instructions for calculating a probability of said identified consistency include instructions for calculating said probability using a Binomial probability function.

18. The system of claim 14, wherein said machine-readable code instructions for calculating a probability of said identified consistency include instructions for calculating said probability using a Gaussian probability function.

19. The system of claim 14, wherein said machine-readable code instructions for generating synthesized data include instruction for generating said data in accordance with a given statistical likelihood meeting an outlier criterion.

20. The system of claim 14, wherein said machine-readable code instructions for generating the outlier detection algorithm include instructions such that said algorithm applies an aggregate of members of said set of classification algorithms, calculates a corresponding set of detection result data representing each of said aggregate's member's classification, and applies a voting scheme to said corresponding set of detection result data.

21. The system of claim 14, wherein said machine-readable code instructions for calculating said uncertainty value include instructions that assume each classification result within said set has a 50-50 probability of representing an operand as meeting an outlier criterion, statistically independent of said operand and of all other classification results within said set.

22. The system of claim 14, wherein said machine-readable code instructions for calculating a probability of said identified consistency include instructions for calculating said probability using a Binomial probability function.

23. The system of claim 14, wherein said machine-readable code instructions for calculating a probability of said identified consistency include instructions for calculating said probability using a Gaussian probability function.

24. The system of claim 19, wherein said machine-readable code instructions for calculating of said uncertainty value include instructions that assume each classification result within said set has a 50-50 probability of representing an operand as meeting said outlier criterion, statistically independent of said operand and of all other classification results within said set.

25. The system of claim 23, wherein said machine-readable code instructions for calculating a probability of said identified consistency include instructions for calculating said probability using a Binomial probability function.

26. The system of claim 23, wherein said machine-readable code instructions for calculating a probability of said identified consistency include instructions for calculating said probability using a Gaussian probability function.

* * * * *